United States Patent [19]

Adams et al.

[11] 4,232,378
[45] Nov. 4, 1980

[54] FORMATION ABSORPTION SEISMIC METHOD

[75] Inventors: Halbert E. Adams, Garland, Tex.; Edgar R. Cooper, New Orleans, La.; Lowell D. Ford, Gretna, La.; Delbert C. Johnson, Marrero, La.; Gregory L. Warren, Tulsa, Okla.

[73] Assignee: Standard Oil Company (Indiana), Chicago, Ill.

[21] Appl. No.: 944,091

[22] Filed: Sep. 20, 1978

[51] Int. Cl.³ .............................................. G01V 1/16
[52] U.S. Cl. ....................................... 367/36; 367/47
[58] Field of Search ................. 340/15.5 R, 15.5 MC, 340/15.5 CP; 367/36, 47

[56] References Cited

FOREIGN PATENT DOCUMENTS 484060  5/1976  Australia ........................... 340/15.5 F
2023476 12/1970 Fed. Rep. of Germany ..... 340/15.5 R

OTHER PUBLICATIONS

Musgrave "Seismic Refraction Prospecting," 1967, pp. 85–118, Society of Exploration Geophysicists, Article by O'Brien.
McNabb, "Bright Spot Warping; It's Not Infallible," pp. 50–51, 8/26/74, The Oil and Gas Journal.
Grant et al., "Seismic Interpretation," 1965, pp. 153–155, Text–Interpretation Theory in Applied Geophysics.
Domenico, "Elastic Properties. . . Lead Reservoirs," 12/77, pp. 1339–1368, Geophysics, vol. 42, #7.
Ito et al., "Changes in Velocity and Attenuation . . . Transition," Dept. of Geophysics, Stanford University.
Werth, "Method for Calculating . . . Refraction Arrival," 1967, pp. 119–137, Seismic Refraction Prospecting.
"Interpretation of Crustal . . . Seismic Refraction Profiles," 1977, pp. 427–439, The Earths Crust, Monograph 20, Purdue U.

Primary Examiner—Nelson Moskowitz
Attorney, Agent, or Firm—James H. Dautremont

[57] ABSTRACT

We have found it possible to investigate subsurface formations in the expectation of locating promising gas fields by a unique refraction seismic technique. Basically one carries out a two-way seismic refraction profile for a fixed spread of geophones and explosions (or equivalent impulse sources) beyond the critical reflection range for shallow refractors, but still rather close to the spread. Then without moving the spread, reproducible records are also made for a two-way seismic refraction profile with the explosions or equivalent sources spaced as far away as convenient, so the refraction paths to the detector groups in the spread is up-going to the detectors for the maximum thickness of beds intervening between the refractor and the group of geophones.

7 Claims, 6 Drawing Figures

FORMATION ABSORPTION SEISMIC METHOD

BACKGROUND OF THE INVENTION

As far as we can ascertain, the type of refraction technique outlined in the abstract has never been practiced before. The fact that porous subsurface geological formations containing a gas phase in at least some of the pores had a different acoustic response from an equivalent, liquid filled formation and that in fact, the attenuation of seismic waves traversing such formations was different, has been known for some time. A recent paper by Dr. S. N. Domenico (Geophysics, Vol. 42, No. 7 (December, 1977), pp. 1339-1368) both gives research results and an adequate discussion of the prior literature. One can at least say that in the 1950's it was known that the velocity and attenuation of seismic waves in petroleum-bearing porous formations was to a degree different from that for those filled only with connate water. Since this changed the reflection coefficient between a reservoir bed and an adjacent bed, the so-called "bright spot" reflection technique was initiated, in which attention was paid not only to the travel time of reflected seismic waves but (and almost uniquely) to the amplitudes of the reflected seismic waves. If a seismic reflection received at a number of different geophone group locations showed that in a region the amplitudes significantly decreased and if it were known that that particular formation was capable of being a reservoir bed, investigators at least felt it merited drilling to determine, for example, the presence of natural gas. It was soon learned that the technique was more qualitative than quantitative since the major change in amplitude of such seismic reflections mostly occurs between a completely liquid filled reservoir and one containing something of the order of 5 to 10% gas saturation. Beyond this, the change is relatively small and hence one has little correlation of the degree or extent of the gas reservoir present. This could be summarized by the statement in the cited reference that "determination of brine saturation (and thereby quantity of gas) from variation in reflection amplitude would be extremely difficult." No mention is made in this paper (nor, as far as we can find out, in the references listed in the extensive bibliography) referring to refraction characteristics.

Refraction seismometry is of course nowhere near as popular as reflection seismometry. The only modern book which considers refraction prospecting in considerable depth is the volume "Seismic Refraction Prospecting," published in 1967 by the Society of Exploration Geophysicists under the editing of A. W. Musgrave. There is a section in this volume (pp. 85-193) dealing with the amplitudes of refraction signals. The most pertinent material here is in the first paper by P. M. S. O'Brien, "The Use of Amplitudes in Seismic Refraction Survey" (pp. 85-118). O'Brien teaches a method of correcting the measured initial amplitudes of received refracted waves for variations due to nongeologic causes, which includes the angle of approach of the incident wave, the ground in the close vicinity of the geophone and the geophone "plant," and the observing system (which well could be called instrumentation), that is the overall sensitivity from the plant through the geophone, the amplifier, and recorder to the measured or recorded amplitude. Applying these corrections, according to O'Brien, is possible, " . . . However, a proper analysis cannot be done to routine; it requires the skill and care of a competent seismologist. Not because the basic concepts are particularly complicated but because the relative importance of the various factors involved may often be difficult to evaluate." He then points out that once allowance has been made for the purely geometrical attenuation due to enlargement of the wave front, instrumentation, and any variation in charge weight, the residual values will depend on such things as lithology, refractor thickness, structure, etc. The closest he comes to discussing attenuation in terms of matters important in our invention lies in his section referred to as Basement Identification, pointing out that after the coefficient of attenuation has been converted from per unit distance into attenuation per predominant wave length, it will probably be found that those having an attenuation of several tenths of a decibel per wave length along the refractor indicate a thick, porous refractor. He mentions nowhere the effect of difference in fluid content of the refractor. He does not refer to the beds lying between the refractor and the geophone groups, which is basically the region of interest in the method we outline below. He also has no comments whatsoever about the pronounced differences that can exist using a technique involving short-range and long-range refractions profiles, which is a basic necessity in our method.

The only other reference found which even by inference considers the matter of gas saturation in a subsurface zone in the course of refraction surveying is in the relatively modern text "Interpretation Theory in Applied Geophysics" by F. S. Grant and G. F. West, McGraw-Hill Book Company, 1965, pp. 153-155. Here the authors state that difficulties arise in refraction interpretation when the velocity does not increase monotonically with the depth. They then show in FIGS. 5-17, page 154, the plotted arrival time of the head wave from a refraction profile at varying distances between shot point and center of spread when the subsurface contains a bed which is characterized by a decreasing velocity. While they go no further, we recognize that such variation is possible in a shallow, gas-containing zone. The authors (in common with the vast majority of those writing on refraction profiling) deal only with arrival times of head waves or so-called first breaks in refraction surveying, and do not deal with amplitudes at all.

There have been some instances of vertical seismic profiling when access to wells penetrating the desired subsurface formations is available. In this case a number of well geophones are suspended on a suitable multiconductor cable so the individual geophones may be recorded. Dynamite charges are then detonated at or near the surface and the first breaks of the well geophones recorded. If there is a gas zone in the ray path from source to geophone, an abnormally low amplitude is recorded. However, such wells are usually not available and even if such can be used, there is only a relatively small zone around the well that can be investigated by this method.

It should be therefore apparent that there seems to be no prior art relatively close to our technique.

SUMMARY OF THE INVENTION

This is a seismic technique involving energy absorption during refraction. It is based on the understanding that the amplitude of a seismic wave refracted through a subsurface porous formation is attenuated if the pores of the formation contain a fluid such as petroleum with less density and differing elasticity from connate water, and especially if at least part of the petroleum is in the gas phase. Accordingly, we are revealing a refraction technique for investigating for such petroleum accumulations and particularly, subsurface reservoirs containing natural gas.

In order to have the ray paths of seismic waves penetrate the formations of interest, we employ long-range refraction profiles in which the up-coming waves from a low-lying refractor below such formations penetrate the subsurface below the respective detector groups in each spread of geophones or the like. The attenuation of such waves is studied. To make comparative use of the attenuation of these waves, it is very desirable to correct the observed amplitudes for differences in intensities of the initiating sources, in near surface response, in geophone-to-reproducible recorder response, and for differences due to geometric divergence. To apply these corrections, we obtain a refraction profile (that is, determine the amplitude of the initially received refracted seismic waves), not only for source locations giving long-range effects (source to end of spread a distance $L_2$) but also for a short-range source location (source to end of spread a distance of $L_1$, which is small compared to $L_2$). Further correction results from using a roll-along technique, so that at the first spread location the head wave amplitudes are obtained for individual sources at essentially equal distances $L_1$ from each end of the spread and for other individual sources at essentially equal distances $L_2$ from each end of the same spread, following this by removing several end groups at one end of the spread, inserting new groups at the opposite end of the spread, recording the refraction first breaks from four new source positions located as stated above with respect to the new spread, and repeating this program until the total survey line desired has been covered.

The corrections mentioned above are applied routinely so that the corrected amplitude of the initially received refracted seismic waves are obtained for each group location, for up-coming wave paths from the long-range refraction shots at each end.

As a final step, we prefer to plot the relative amplitudes so obtained on a cross-sectional map of the survey line along the up-coming paths to each group location. This helps in the determination of any subsurface location involving anomalous attenuation (usually greater attenuation than the average), which may determine the location of a subsurface petroleum deposit.

The benefits of this method as a novel seismic location method or technique are several. Among these are the following:
1. In many instances, it can replace vertical shooting in wells (see discussion above). The disclosed system is cheaper, presents no risk to the well (in fact, involves no use of a well drilled to a depth greater than that of the hoped-for-petroleum deposit) and the method can be used regionally rather than only close to such a well.
2. It can be used as an original exploration tool to find drilling prospects.
3. Delineation of stratigraphic gas and oil traps is possible.
4. It provides additional information to the exploration geophysicist for interpreting subsurface anomalies in conjunction with reflection seismic lines, which can be obtained almost at the same time as the shooting using this new technique.
5. It is not necessary to determine the depth nor the velocity of refraction interfaces accurately in order to acquire a reliable cross section using this novel technique.

DESCRIPTION OF THE DRAWINGS

In order to describe the best method of carrying out this novel seismic method, the inventors refer to the attached set of drawings, which form a part of this specification and are to be read in connection with it. In these drawings, the presence of the same reference numeral in more than one figure refers to the same or an analogous part. In the drawings.

DESCRIPTION OF THE PREFERRED EMBODIMENT

Figure 1:
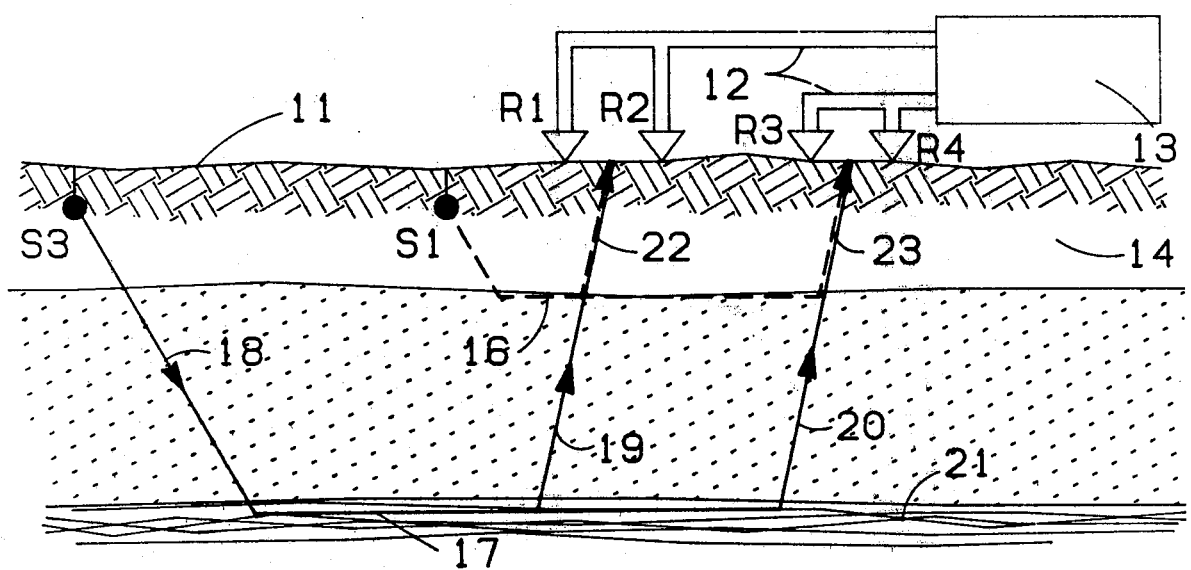
FIG. 1 shows in diagrammatic form a cross section of the earth with two source locations and two geophone group locations forming part of a spread employing the techniques forming this invention.

In FIG. 1 is shown in highly diagrammatic form a cross section of the earth below the surface 11, illustrating ray paths for seismic waves for a short-range and a long-range refraction profile from two individual source locations at S1 and S3 to two geophone groups. We prefer that these sources be of an impulsive type, such as an explosion of dynamite, dropping of a weight, etc. In passing, it should be noted, however, that it is possible to employ a vibratory type of source such as that used in the well known Vibroseis ® process. In this case, the received recorded signals are convolved with the vibratory pilot signal, as well known in the art, to produce a resultant record having an initial wave portion equivalent to the initially received compressional waves refracted from an impulsive type seismic source.

The short-range source location S1 is located "near" a spread of seismic detectors such as geophones. These are normally planted in groups at or near the surface of the earth 11. In FIG. 1, two groups of two geophones each (R1 and R2, and R3 and R4) are each connected additively by suitable insulated electric cables 12 to the instrumentation assembly shown as rectangle 13. (We can use from one geophone to ten in a group; we ordinarily used two or three). The signals incoming from the various geophone groups (ordinarily of the order of 48 groups are employed) are amplified and recorded on a reproducible recorder. At present such recording frequently and desirably is in digital form, the amplitude of the group detectors being sampled at substantially equal intervals of time such as a millisecond and serially recorded in digital form for subsequent reproduction.

The number of geophones in the group depends very much on the size of impulsive source provided and random noise cancellation. Groups are ordinarily planted along or near the surface of the ground 11 at spacings between the midlocations of each group of the order of 200 to 350 feet or more. Frequently group spacing is uniform. Most frequently the geophone groups making up a spread will be planted at least approximately in a straight line (see for example the plan view of FIG. 4). Occasionally we have used some in a second line intersecting the first.

Figure 2:
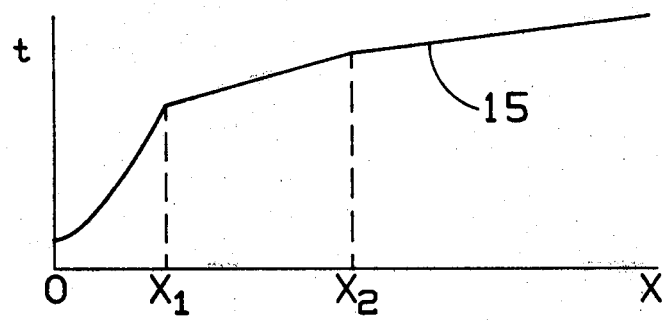
FIG. 2 is a diagram of the arrival time of the initially received seismic waves at each of a plurality of geophone groups located in the spread on or near the surface of the ground.

The choice of distance $L_1$ from one end of the spread of geophone groups to the short-range impulsive source location S1 is ordinarily determined in a preliminary refraction profile. One wishes to be sure that the distance $L_1$ is greater than the minimum distance for which an impulsive source would produce first arrivals at the nearest geophone group consisting of reflections from the top of the first prominent refractor 14 below the weathered layer. Since seismic waves travel ray paths governed by Fermat's Principle, we prefer to carry out a preliminary survey in which one uses a series of shots at varying distances from the first group, recording the travel time from initiation of the source to the reception of the first arriving waves at the group. This is shown in plot form in FIG. 2. Here the time of arrival t is plotted against the distance from the source to the first geophone group, x. It is noted, as is well understood in this art, that reflection arrivals predominate in the early section of this plot, after which there is a first arrival of refracted waves out to the distance $x_1$. The slope of at least the majority of the first part of the profile 15 is about constant. This of course shows the arrival of refracted seismic waves up-coming from immediately below the top interface 15 of this first refractor. If one continues with further investigation at still greater lengths from source to initial group, a relatively abrupt change in slope of the profile 15 is found between distances $x_1$ and $x_2$, corresponding to first arrivals traveling generally along dashed ray path 16 immediately adjacent the bottom of formation 14. Accordingly, we prefer to have the distance $L_1$ be located somewhere between the distances $x_1$ and $x_2$ shown in FIG. 2.

Incidentally, the part of the refraction profile 15 beyond $x_2$ shows arrivals refracted along a different, longer ray path 17, the seismic waves having travelled a first Section 18 downward from the source location such as S3, along a deeper deep refractor 21 (located below the zone of interest to be investigated by this method), then up along section 19 to the first group of detectors. For ease in illustration, the total ray path of refracted first arrivals from the source S1 located between distances $x_1$ and $x_2$ is shown in FIG. 1 in a dashed line while the equivalent ray path for seismic waves first arriving at this first group from source S3 is shown in a solid line.

It is well known in refraction technology that the angle of part 18 of the ray path 17 with respect to the vertical is the critical angle, governed by Snell's Law, as is the angle of the up-coming portion 19 of this ray path. It is also to be noted that the first arrival at the second group of seismic detectors or geophones is along a section marked 20, which is essentially at the same angle as that of 19, that is $$\sin\theta \approx v_1/v_2 \qquad (1)$$

where $v_1$ and $v_2$ are the velocity of compressional waves in formations 22 and 21, respectively.

It is to be understood in the material that follows (and in the claims) that the distance $L_2$ is large compared to the distance $L_1$, usually being a minimum of at least three times as long. We have generally made the length $L_2$ quite long, of the order of 5 to 15 miles. $L_1$ was usually of the order of 1 to 5 miles. Obviously $L_2$ was usually several times $L_1$. Having $L_2$ greater than $L_1$ insures that the first arrivals from the source at $L_2$ (the waves refracted along ray paths such as 17) which arrive at the geophone groups are from a deep refractor 21 in the region. Then the length of the region being investigated, which is essentially the length of the section 19 ray path 17 (for example) is as great as possible.

From the FIG. 1 the basic general scheme of our invention can be perceived. The first arriving refracted waves along the dashed ray path 16 from S1 to the various groups of detectors has substantially in common with that along ray paths such as 17 from the long-range source S3 the sections of the ray path marked 22 and 23 to the first and second groups of detectors, respectively. Any attenuation in amplitude along a path such as path 22 will be common both to the deep seated up-coming refracted wave along path 19 and the shallow equivalent of it along ray path 16. Thus, amplitude effects due to the shallow part of the earth lying below the groups of detectors (roughly in Zone 14), the effects of the seismic "plants" (the mechanical coupling of the detectors to the earth), as well as any differential effects of the instrumentation into which the cables 12 lead, will be the same along both of these paths. Corrections for amplitude for these shallow effects and instrumentation effects can be made, using the short-range refraction profiles from S1.

Figure 3:
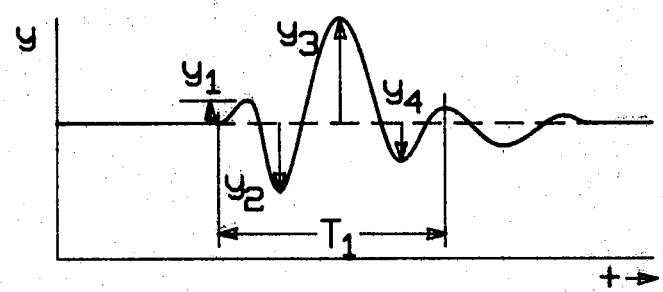
FIG. 3 is a simplified view of a part of an amplitude-vs-time plot for geophone response to a refracted wave forming the first arrivals of seismic energy at a geophone group.

Basically our method involves study of the relative amplitudes of the first arriving refracted waves at the respective geophones along the deep seated ray paths 17. These are various definitions of what is meant by the initial amplitude of the seismic waves reaching a geophone group. In FIG. 3, a typical wave form of initial waves arriving at a geophone group is plotted in terms of amplitude y versus time t. The amplitude is essentially zero up to the point that the first seismic wave arrives, ordinarily a compressional wave. As shown in FIG. 3, this produces a peak amplitude during the first half-cycle of $y_1$, a (negative) peak amplitude during the second half-cycle of $y_2$, during the third half-cycle of $y_3$, and so on. We prefer to use the amplitude $y_1$ in the discussion that follows. However, it is to be understood that sometimes, especially for particularly long-range refraction profiles, it is difficult to ascertain with any precision the amplitude $y_1$ of the first departure from the zero line. In that case, we use the next best thing, which consists in applying an arbitrary "time window" of length $T_1$, as shown in FIG. 3. In this case, the peak amplitudes $y_1$, $y_2$, $y_3$, $y_4$ (that is, the peak amplitude of each half-cycle seen after the first appreciable departure from zero) that exist up to the time $T_1$ are measured, squared, the squared amplitudes summed, and the square root of that sum taken. It is to be therefore understood that where we speak of the amplitude of initially received seismic waves at a group of detectors, we are referring either to $y_1$ or the root-mean square amplitude from the time window. $T_1$ is preferably about 100 milliseconds.

In the general scheme of carrying out this invention, after the geophone spread is planted (see FIG. 4 where the rectangles 1, 2, 3, up to 48, refer to group locations of the seismic detectors and S with an additional number refers to source locations), a first source location S1 is picked so that this location is at least approximately in line with the spread and at a distance $L_1$, such that the first arrivals at the various detector groups will be from a shallow refractor. The impulsive source is initiated and the instrumentation 13 used to make a reproducible record of the amplitude of the initially received seismic waves at each of the plurality of groups 1 through 48 of the detector groups in the spread. This same procedure is repeated for a second source location S2 which is located substantially at the same distance $L_1$ from the opposite end of this spread. Following this, the source at location S3 at a much greater distance $L_2$ from the end of the spread and essentially in line with it is initiated, and the same recording procedure is carried out. Finally, the same procedure is carried out for initiation of a source of seismic waves at location S4, a distance essentially of $L_2$ opposite the other end of this first spread.

While further records could be made, if the data are satisfactory, there is no need of further records at this spread location. Accordingly, a technique known as the roll-along system is employed. Ordinarily six to eight groups of detectors are moved from locations such as those shown at locations 1, 2, 3, 4, to the opposite end of the spread. The distance that the spread is moved along depends upon the operators, of course. We prefer to have this distance of the order of a half mile, although if much more close control is desired, it is possible to move as little as one or two groups only. In any event, we prefer that a majority of the groups for the second spread be at the same locations they were for the first, while the other groups are systematically moved to the opposite end of the spread. The procedure of the four refraction profiles is then repeated with the short-range shot location moved to S5 (such that, preferably, the distance from S5 to the left end of the new spread is still essentially $L_2$). Location S6 is similarly a distance $L_2$ from the new spread end. S7 is at the distance $L_1$ from the other end of the spread, and so on. This same procedure is employed for each move that is made, provided that there is no particular difficulty on the profile due to inability to obtain a permit, or an inaccessible locale for a seismic source initiation, etc. Since these matters are well known and handled in ordinary reflection geophysical prospecting, no special attention need be given here.

The next step in the procedure after the field measurements have been made and all data is in, is the very important step of correcting the amplitude of the initially received refracted waves for the long-range source locations at each end of the various spreads. This permits the determination of the relative attenuation along the various paths 19 and 20 up-coming from the deep-seated refractor such as 21. Actually, in our method, short-range corrections are made first and long-range corrections are made second, so these will be discussed in that order.

Short-Range Corrections

1. Shot Correction

The amplitude of the initially received refracted waves from one seismic wave initiation at a short-range source location (such as S1) are measured at each of the n geophone groups. In the following, let the first subscript identify the group location and the second subscript identify the spread location (which similarly locates the sources for the waves). Then $y_{11}, y_{21}, \ldots, y_{n1}$, represents the measured amplitudes of the first-arrived waves at the first spread location for each of the group locations. These amplitudes have been plotted in FIG. 5A, for a source which in this figure must have been at the right side of each of the spreads shown. Each plotted amplitude is distinguished by a separate drafting symbol such as a square, triangle, circle, or the like. It is to be noticed that, as mentioned above, there is a sort of similarity to the amplitudes measured, in that generally the amplitude at the right-hand side (closer to the source) is greater than at the left extreme, but generally speaking it is noted that the amplitudes differ at any particular group location for a different shot. Accordingly, the first correction which is made is the so-called "shot correction". This could be made by normalizing the measured amplitudes such as $y_{11}, y_{21}$, etc., by theoretical application of the experimentally determined response of the earth to differing weights of explosive detonated at the various locations such as S1, S5, and the like. (See "Efficient Use of Large Charges" by P. N. S. O'Brien, Seismic Refraction Prospecting, op.cit., especially pp 155–157). However, we choose not to rely on theory. Let $$Z_1 = y_{11} + y_{21} + \ldots + y_{n1} \qquad (2)$$

$$Z_2 = y_{22} + y_{32} + \ldots + y_{(n+1)2} \qquad (3)$$

and so on. Now, to normalize the measured amplitudes, we prefer to take one set of data such as $y_{11}, y_{21}, \ldots, y_{n1}$ as standard and make the short-range shot correction by multiplying each of the individual amplitudes $y_{22}, y_{32}$, etc., to $y_{(N+1)2}$ by the ratio $z_1/z_2$. Thus amplitudes $y_{33}, y_{43}, \ldots, y_{(n+2)3}$ similarly would be individually multiplied by the ratio $z_1/z_3$, where $$Z_3 = y_{33} + y_{43} + \ldots + y_{(n+2)3} \qquad (4)$$

Figure 5:
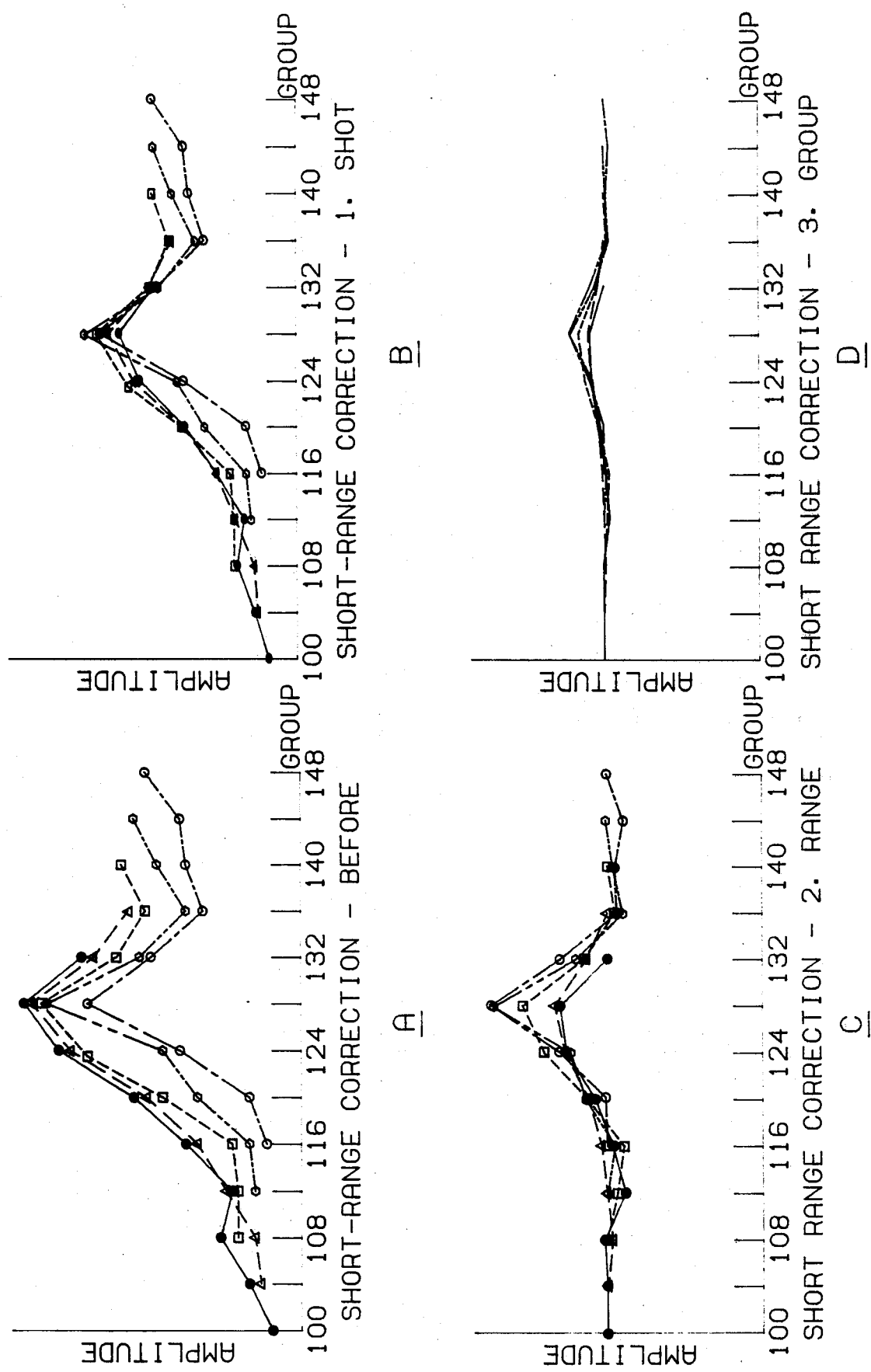
FIG. 5 shows a series of plots of amplitude obtained from short-range refraction profiles obtained with geophones in five successive spread positions using the roll-along technique, and illustrating the nature of the amplitude corrections made for shot, range, and group.

Such corrected amplitudes are symbolically shown by a prime, such as $y_{22}'$, $y_{43}'$, etc. in FIG. 5B.

2. Range Correction

Figure 4:
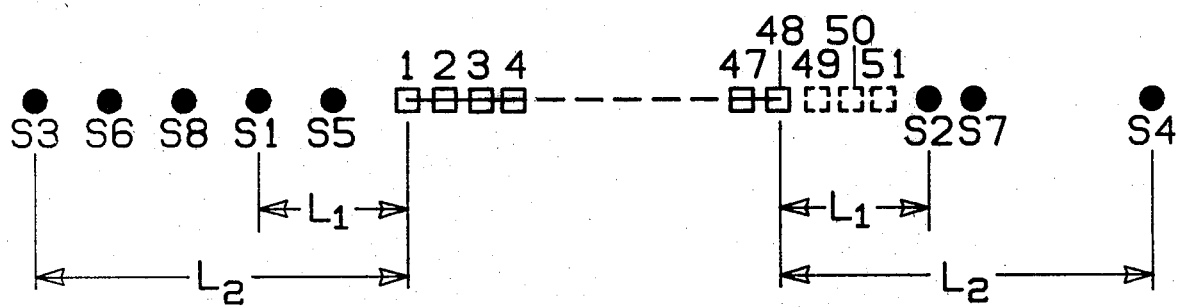
FIG. 4 shows in plan view and diagrammatic form (not to scale), the group locations for 48 geophone groups in a spread, the corresponding location of four seismic sources used in making short-range and long-range refraction profiles for the spread location shown, as well as advance positions for other geophone groups to be occupied during the roll-along technique, and shotpoint locations associated with the move.

The second short-range correction normalizes the corrected amplitudes (that is, those obtained using the shot correction), for differences due to range, that is, distance of the short-range source to each particular group. Theory indicates such a correction can be made from a rather complicated formula (see O'Brien, op.cit., p157). We prefer to use a different approach. If the source-group distance were constant, the amplitude should be constant also, or the average slope of the shot corrected amplitude plotted against receptor group location should be zero. Accordingly, we make a correction by applying a least-squares fit to $y_{11}'$, $y_{21}'$, $y_{31}'$, etc., $y_{22}'$, $y_{32}'$, etc., in terms of distances x from sources S1, S5, etc. to the respective group (as shown in FIG. 4), then multiplying each of the amplitudes $y_{11}'$, $y_{21}'$, $y_{22}'$, etc., by the inverse amplitude of this fit. Put another way, we apply a polynomial amplitude fit in terms of the distances x, etc., from each short-range source location to the group locations, and determine mathematically what each amplitude would be if one ignored all polynomial terms varying with x or any power of x. This produces doubly corrected amplitudes $y_{11}''$, $y_{21}''$, $y_{31}''$, $y_{12}''$, $y_{22}''$, etc. Note that these corrected amplitudes, if plotted at the appropriate group location (as is carried out in FIG. 5C) give a set of amplitude graphs the average slope of each of which is zero.

3. Group Correction

The third and last short-range correction takes care of differences in amplitudes of the initially received refracted waves from each short-range seismic wave initiation due to local effects such as variation in attenuation of refracted waves in the weathered zone immediately below the group, differences due to variations in the planting of the geophones, and variations in instrumental arrangements such as geophone sensitivities, amplifier gain, or recorder response. Here we normalize the amplitudes already corrected for range (those plotted in FIG. 5C) so that one has common group amplitudes. The correction is made by adding the range-corrected amplitudes due to the various short-range seismic wave sources from one side (such as S1, S5, and the like) at one group location. In effect, one sums at the $n^{th}$ group:

$$W_n = y_{n1}'' + y_{n2}'' + \ldots + y_{nm}'' \tag{5}$$

where m is the number of corrected amplitudes recorded at the $n^{th}$ geophone group.

Then each value is multiplied by $1/W_n$ to produce a group-corrected amplitude such as $y_{n1}'''$, $y_{n2}'''$, etc. Usually we find that it is desirable, after making one full set of corrections as outlined above, to iterate the corrections, that is, again normalize the already corrected amplitudes for shot size, for range, and for group, in that order.

In any case, the total normalization factor applied for group correction is retained for later use as described below.

It is probably obvious, but should be mentioned since no actual mention has been made, all three short-range corrections discussed above are applied to refraction profiles with respect to sources only on one side of the spread at a time. Thus, referring to FIG. 3, the corrections calculated at one time involve the spread of geophone groups such as 1–48 or the like, with source locations S1, S5, but not S2, S7 and the like. A separate set of corrections is calculated for the same detector spreads but with source locations at S2, S7, etc.

Long-Range Corrections

The order of applying corrections to the long-range profile (that is, to the amplitudes of the initially received refracted waves from seismic wave initiation at long-range source locations such as S3, S6, etc., FIG. 4) is changed from that used with the short-range data.

1. Group Correction

Since the last part of the paths of the refracted waves reaching the geophone group, at one location is along approximately the same ray path (such as 22) whether the source location is S1 or S3, the same group correction is applied to the amplitudes for the long-range profiles as that determined in Step 3 above, that is, the local effects correction.

2. Other Corrections

The other respective corrections to the group-corrected amplitudes from the long-range refraction profiles are shot correction and range correction. These are applied in that order, and we ordinarily find it is advantageous to apply these iteratively. In any case, the individual correction being applied is computed in the same way already discussed for the short-range corrections, though the shot size and the range is usually considerably larger than that for the short-range refraction profiles.

3. Final Handling

When it is apparent that further correction of the long-range refraction data will not appreciably alter the now corrected amplitudes of the initially received refracted waves for the deep refractions, two final steps are carried out.

In the first of these, we take the ratio of the average corrected amplitude of the initially received refracted waves in terms of the individual location of the geophone group. Put another way, one takes a set of ratios in which each numerator over a common set of group locations is the corrected amplitude due to, for example, the source at location S6, and the denominator is the corresponding corrected amplitude at the identical group location due to the source at location S3. These ratios for all common group locations are then averaged to produce a single number, which is divided into the amplitudes from the S6 source. The same technique is then carried out for the next pair of adjoining locations (say for S8 and S6). This produces, of course, a further normalization.

Then one averages the finally corrected amplitudes at each group. Anomalous absorption along the up-going ray paths will be manifested from the above average amplitudes by a set of adjacent groups with lower-than-normal average corrected amplitudes. This permits us to locate zones of anomalous absorption, such as high absorption, which are diagnostic differences frequently associated with presence of petroleum, such as natural gas, in the pores of such zones.

An alternative process to the long range correction step given immediately above can be used, which we feel is superior. In this case, after the corrections for the long-range refraction amplitudes have been made, by making the group correction from Step 3 of the Short-Range Corrections, one applies Steps 1 to 3 of the Short-Range Corrections iteratively to the long-range refraction data. The new values of group correction for the long-range profiles are inversely proportional to the attenuation along the up-going ray paths such as path 19. Accordingly, for each group location, in this case one needs to map the inverse value of the long range group corrections as amplitudes.

Figure 6:
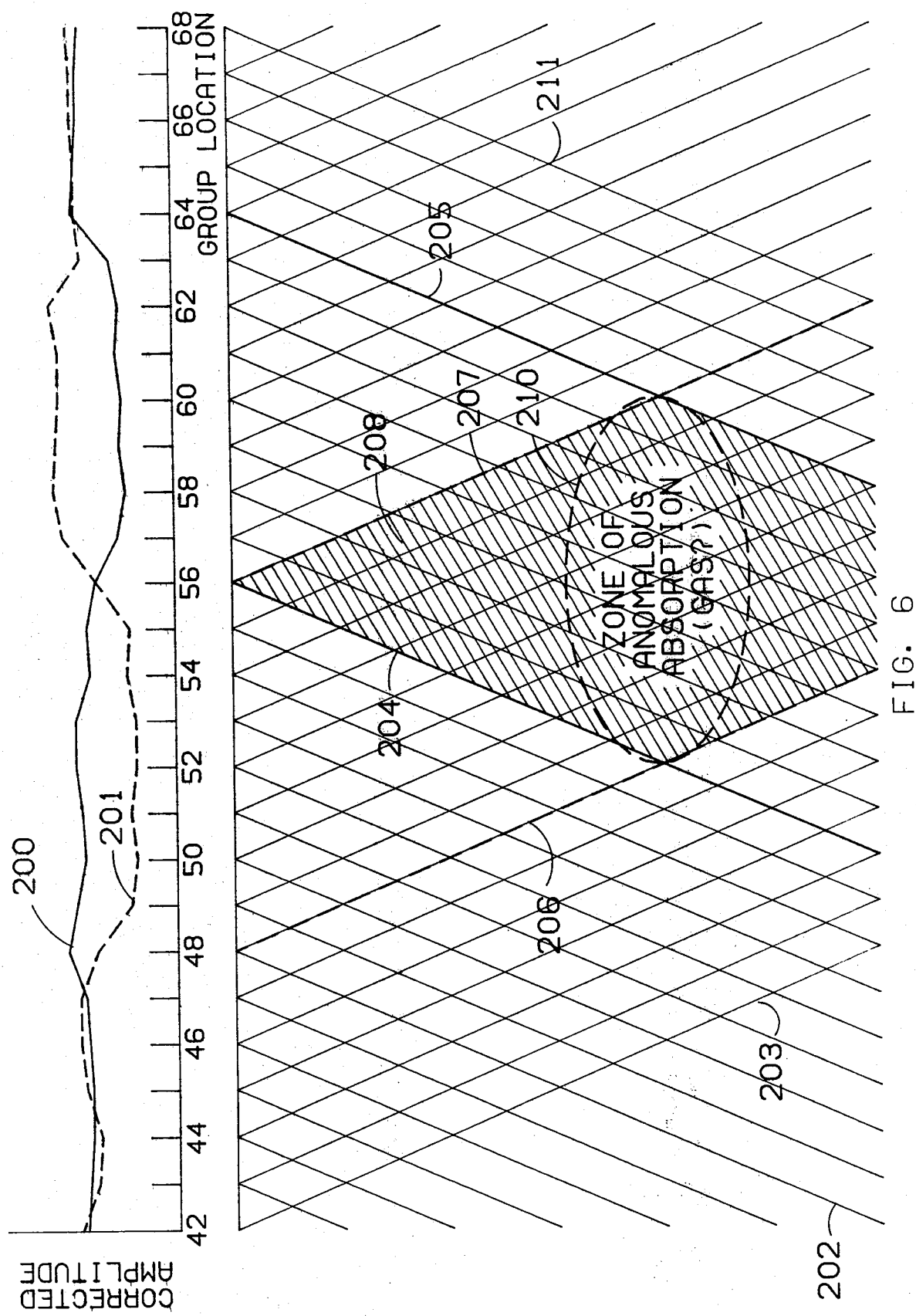
FIG. 6 shows in diagrammatic form a map of a cross section of the earth on which had been plotted in two ways the corrected relative amplitudes of the initial seismic energy received using the long-range refraction profiles in accordance with this invention, including a region of anomalous (in this case high) absorption.

At this point, either the ratio method or the repeated correction method just discussed has produced a finally corrected amplitude of initially received waves from the up-coming refracted waves along paths such as 19, with the seismic source at one end of the spread, and corresponding values along a different ray path up-coming to the same detector group from the seismic source at the other end of the spread. We prefer to carry out the final step as shown in FIG. 6. We plot—on any desired amplitude scale—the finally corrected amplitude opposite the location of the various detector groups. This is shown in the top of FIG. 6 with the solid line 200 representing the finally corrected amplitudes of the initial waves from the long-range refraction profiles with the source to the left of the spread, and dashed line 201 representing similar data for the source location to the right of the spread. Accordingly, we realize that there are two separate sets of amplitudes to plot essentially at each group location. When all such values have been appropriately plotted, one needs to project these two sets of data. The simplest way to do this is to prepare a cross-section map, which is shown in the lower part of FIG. 6. Here the group location is plotted along the top of the map and up-coming lines are shown terminating at each group location at the appropriate angle for the incoming refracted waves, in accordance with Snell's Law, such as lines 202 and 203. These lines represent refracted ray paths, and such paths are known to be sets of bent lines. We show them straight for simplicity. We then locate regions of anomalous amplitude from the upper plot, such as the region from group location 57 to 64 on line 200. These are projected along the lins 202, representing up-coming refracted waves from a source at the left, as shown by the large solid lines 204 and 205. These outline a band in which up-coming refracted waves demonstrate anomalous absorption.

On the dashed line 201, we ascertain the existence of a similar anomalous absorption between group locations 48 and 56. Since this data is for sources to the right of the spread, from these boundaries of that high absorption zone one draws downward heavy dashed lines 206 and 207.

On this cross section map, the zone of anomalous absorption region logically should be bounded by the four lines 204, 206, 205 and 207 and hence should be expected to occur in the diamond-shaped hatched area 208. We would probably expect the zone to be best outlined where the anomalous absorbing region is constricted vertically, because petroleum accumulations usually are, so would outline it by the estimated dashed line 210.

More precise ideas as to the zone of anomalous absorption can be made by plotting at each intersection of a line of one slope (such as line 202) with that of the opposite slope (such as line 203), the average of the two amplitudes common to such intersection from the two appropriate group locations. Thus, one could plot at an intersecting point such as 211 the average amplitude or product of (a) the solid line trace 200 at station 66, and (b) the dashed line trace 201 at group location 61. Then one could contour these intersections. We have found that both procedures appear effective in localizing the zone of anomalous absorption, which is what we are interested in. In this example, the anomalous values are consistently low, indicating higher than normal attenuation of up-coming refracted seismic waves in this zone, and probably existence of a gas phase in the pores of the subsurface reservoir.

It is to be understood that in the accompanying drawings and written description of the one embodiment, we have tried to describe to those skilled in this art how best to carry out this embodiment of our invention. The scope of the invention is not determined by such description, but is best defined by the appended claims.

We claim:

1. A seismic prospecting method for finding zones of anomalous absorption of seismic waves between pairs of refractive layers in subsurface formations, comprising:
   a. locating a number of seismic wave detectors in a plurality of groups in a first spread at least near the surface of the earth;
   b. initiating seismic waves at a first source location near the surface of the earth a distance $L_1$ from one end of said spread, and making a reproducible record of at least the amplitude of initially received refracted seismic waves at said plurality of groups of detectors from this initiation;
   c. repeating step b for seismic waves initiated at a distance $L_2$ from said one end of said spread, $L_2$ being at least substantially greater than $L_1$;
   d. repeating step b for seismic waves initiated substantially at a distance $L_1$ from the opposite end of said first spread;
   e. repeating step b for seismic waves initiated at least substantially at a distance $L_2$ from said opposite end of said first spread;
   f. locating a second spread of detectors in which at least the majority of said groups of detectors have not been moved, but at least one such group of detectors in said second spread is at a new location at an end of said second spread;
   g. repeating step b, c, d and e for the detector groups forming said second spread, whereby the relative amplitudes of said initially received seismic waves corrected for size of shot, range and group may be determined for refracted waves received at each group for seismic wave initiations at the various locations $L_2$, and
   h. plotting on a cross-section map on up-coming lines representing at least approximately the up-coming paths of refracted waves to the various detector group locations, the corresponding value of said relative corrected amplitudes of said initially received seismic waves at said various detector groups, so that zones of anomalous absorption of refracted waves may be ascertained.

2. A method in accordance with claim 1 in which:
   a. $L_2$ is several times $L_1$, the number of groups in each spread is substantially constant,
   b. each of said spreads is in at least approximately a straight line,
   c. at least the majority of said groups in any spread are approximately equidistantly spaced (at a spacing of about $L_3$), and
   d. the distance from an end of said second spread to the corresponding end of the prior spread is at least approximately $L_3$.

3. A method in accordance with claim 2 in which:
   a. the initiation of seismic waves is of an impulsive nature, and
   b. said distance from end of second spread to the corresponding end of the prior spread is between six and ten times L3.

4. A method in accordance claim 2 in which:
   a. the initiation of seismic wave is a vibratory pilot signal of unique wave form, and
   b. each reproducible record includes the reception at said detector groups of seismic waves from said vibratory pilot signal refracted to said groups.

5. A method in accordance with claim 2 in which:
   a. the correction of relative amplitudes of waves for size of shot consists in normalizing said amplitudes such that the average of said amplitudes for all groups of each of said spreads due to initiations equal distances from short range initiation point to a common group in each such spread is equalized, producing, thereby, a first corrected set of amplitudes, b. the correction for range consists in normalizing said first corrected set of amplitudes for group position in a spread to produce a second corrected set of amplitudes in which the average slope of said second set of amplitudes (if plotted against group position in a spread) has a value of zero, and c. the correction for group equalizes the average values of each of the second corrected set of amplitudes, whereby this last named correction may be used in the equivalent corrections for said relative amplitudes obtained using the corresponding long-range initiation points.

6. A method in accordance with claim 1, wherein the distance $L_1$ is chosen so that it is greater than the minimum distance for which an impulsive source would produce first arrivals at the nearest seismic wave detector group.

7. A method in accordance with claim 1 or claim 6, wherein the distance $L_2$ is chosen so that it is at least three times as long as the distance $L_1$.

* * * * *